United States Patent [19]

Tsau

[11] Patent Number: 5,085,876
[45] Date of Patent: Feb. 4, 1992

[54] FAST DISSOLVING SWEETENING AGENT INCLUDING CARAMEL

[75] Inventor: Josef H. K. Tsau, Skokie, Ill.

[73] Assignee: The NutraSweet Company, Deerfield, Ill.

[21] Appl. No.: 547,659

[22] Filed: Jul. 3, 1990

Related U.S. Application Data

[63] Continuation-in-part of Ser. No. 271,977, Nov. 16, 1988, abandoned.

[51] Int. Cl.⁵ .............................................. A23L 1/236
[52] U.S. Cl. ...................................... 426/92; 426/548; 426/285; 426/302
[58] Field of Search ................... 426/548, 285, 96, 302

[56] References Cited

U.S. PATENT DOCUMENTS

| | | | |
|---|---|---|---|
| 3,510,311 | 5/1970 | Swaine et al. | 426/591 |
| 3,962,468 | 6/1976 | Pischke et al. | 426/548 X |
| 4,051,268 | 9/1977 | Shires et al. | 426/548 |
| 4,176,201 | 11/1979 | Cook | 426/548 |
| 4,338,350 | 7/1982 | Chen et al. | 426/548 X |
| 4,497,835 | 2/1985 | Adolph | 426/590 X |
| 4,508,740 | 2/1985 | McSweeney | 426/548 X |
| 4,537,763 | 8/1985 | Miyake et al. | 426/548 X |
| 4,551,342 | 11/1985 | Nakel et al. | 426/548 |
| 4,579,742 | 4/1986 | Lavie | 426/96 |
| 4,716,046 | 12/1987 | Lavie | 426/103 X |

FOREIGN PATENT DOCUMENTS 2104369  3/1983  United Kingdom .

*Primary Examiner*—Joseph Golian
*Attorney, Agent, or Firm*—Jeffrey M. Hoster

[57] ABSTRACT

A product which includes sweetening agent and caramel is disclosed. The product includes limited amounts of caramel and is surprisingly fast dissolving.

13 Claims, No Drawings

FAST DISSOLVING SWEETENING AGENT INCLUDING CARAMEL

This application is a continuation-in-part of U.S. Ser. No. 07/271977 filed Nov. 16, 1988 and now abandoned.

Background of the Invention

1. Field of the Invention

This invention relates to methods of making a product including an artificial sweetening agent such as aspartame. More particularly, this invention relates to a method of making a fast-dissolving sweetening product including caramel, which also has improved dust and flow characteristics.

2. Description of the Prior Art

It is often difficult to use sweetening agents in desirable products. For purposes of this application, sweetening agents shall include, but not be limited to, aspartame, saccharin, cyclamates, acesulfam-K, trichlorogalactosucrose (TGS, sucralose), and alitame. Appearance, chemical and physical properties, instability, potency, and handling and manufacturing difficulties may reduce the applicability of sweetening agents, particularly in powder form. When low dust, free-flowing, fast-dissolving or fast release requirements are necessary, sweetening agents may be difficult to use.

Aspartame is sometimes difficult to use as bulk aspartame is a slow-dissolving, dusty powder made up of needle-shaped crystalline particles having static and poor flow characteristics. The beverage industry is concerned about waste due to dust and slow dissolution of aspartame. Loss of the aspartame may occur as dust is lost into the air and absorbed onto the surfaces of equipment and containers during manufacturing, transportation, handling, and use.

A variety of methods have been proposed to overcome the dust, flow, and dissolution problems of aspartame powder. These methods include granulating aspartame with bulking agents such as sugars, dextrins, and maltodextrins. In successful products, a high percentage of bulking agents is typically mixed with a small percentage of aspartame, as the characteristics of the bulking agent in large quantities are required to produce a fast-dissolving product. Granulation methods have included fluid-bed granulation, spray drying, co-drying, high shear energy granulation, roll compaction, and extrusion methods. For example, U.S. Pat. No. 4,497,835 to Adolph teaches the use of a mix including hydrolyzed cereal solids, a food acid, a flavor, a clouding agent, aspartame and a color. All ingredients other than the color are premixed, with the color solution added as the ingredients are being blended. The mix has improved dissolution in powdered beverage mixes However, the mix includes at least 10 parts of the other ingredients to 1 part aspartame.

One particular process is found in U.S. Pat. No. 3,962,468 to Pischke et al. Pischke details a process for producing a dispersion of aspartame and dextrin. Some of the aspartame particles preferably remain as undissolved particles which are encapsulated in dextrin.

A process which attempts to address the concerns of the beverage industry is found in U.K. Patent 2104369B to Sharma. The Sharma patent discloses an aspartame concentrate which is a mixture of from 1-35% aspartame and 65-99% caramel coloring. The concentrate is typically used for making aspartame-sweetened syrups for carbonated beverages. The concentrate may be used in a liquid form or dehydrated to obtain a powder product. There are difficulties in using aspartame in the manner disclosed by Sharma. The levels of caramel and aspartame in the mixture result in hygroscopic and moisture intolerant mixture which upon exposure to moist air turns quickly to a sticky substance which is difficult to handle and transport. By forming a mixture of caramel and aspartame in the amounts disclosed by Sharma, handling problems similar in scope to those caused by typical aspartame powder use remain, e g., the product will not be free-flowing. Plus, the color of the caramels described as used in the patent is very intense, and the combined product can only be used in applications where intense coloring is desirable. Manufacturing problems may also result as it is difficult to use the aforementioned granulation methods with such a high level of caramel.

Thus, there is a need for a method of producing sweetening agents, particularly aspartame, in a fast-dissolving form.

SUMMARY OF THE INVENTION

The invention is a sweetening agent product which is fast-dissolving. The preferred invention is a fast-dissolving granular sweetening agent which also has improved dust and flow characteristics. The sweetening agent is mixed with low levels of caramel to form a fast-dissolving powder. The sweetening agent may also be wetted by a caramel solution and dried to form a powder or granular product. Preferably, a caramel powder and water or a caramel solution is used as a granulation agent to make a granular product which, upon drying, is dust-reduced, free-flowing and fast-dissolving. The sweetening agent is preferably mixed in a dry weight percentage of from about 70% to about 99.5% with the caramel in a dry weight percentage of from about 0.5% to about 30%.

DETAILED DESCRIPTION OF THE PREFERRED EMBODIMENT

The inventive product includes a mixture of a sweetening agent and a dehydrated caramel, with the sweetening agent present in an amount at least two times the amount of caramel in the mixture. (For purposes of this application, dehydrated caramel means that the caramel in the final product has a limited amount of moisture. The caramel may be in powder or syrup form prior to mixing). Preferably, caramel is present in a dry weight percentage of from about 0.5% to about 30% and an artificial sweetening agent, preferably aspartame, in a dry weight percentage of from about 70% to about 99.5%. (For purposes of this application, amounts and percentages of caramel and sweetening agent are discussed in a "dry weight basis." This means that water may be present in the mixture, but is not considered in discussing percentages and ratios of caramel and sweetening agent.) Water may be present as residual moisture in the product up to about 8% moisture without significantly affecting the performance and stability of the product. The product dissolves at an unexpectedly fast rate. When the sweetening agent is granulated with caramel, the product also has improved dust and flow characteristics.

The caramel and sweetening agent can be mixed together by a number of methods, each of which results in a sweetening agent/caramel mixture having improved dissolution rate. The "caramel" contemplated by this invention includes any conventionally available caramelized sugars. Caramelized sugars are made by heating sugar solutions such as liquid corn sugar to a high temperature, e.g., 125° C. Caramel may be either in syrup form or dry form such as powders. Caramel is conventionally used in a variety of food products including beverages and confections. Caramels are desirable for applications requiring color with little caloric value. Suitable caramels include, but are not limited to, those manufactured by the Sethness Products Company. Particularly suitable caramels are beverage-type caramels manufactured in the presence of ammonium bisulfite as a reactant. Particularly suitable caramels have a pH in the range of about 2.5-5.0 and an isoelectric point below 2.5. Examples of preferred caramels include Sethness Products Company Double Strength 400SM and AP100SM. Surprisingly, small amounts of caramel have been found capable of significantly improving the dissolution rate of large amounts of sweetening agent. This is particularly surprising with aspartame, as previous attempts to improve the dissolution rate by use of bulking agents have had limited success or have required relatively large amounts of bulking agent. For purposes of this application, the term "bulking agent" includes those substances conventionally mixed with aspartame or other sweetening agents. These substances include, but are not limited to polydextrose, maltodextrin, gum arabic, dextrose, and corn syrup solids.

The caramel has been found to mix with, granulate and/or coat the sweetening agent in various methods to form fast-dissolving products. In one method, caramel in syrup form is diluted with water and added to the sweetening agent to form a slurry, which is dried and milled. In a second method, the sweetening agent is mixed with a dry caramel powder and then wetted with water to obtain a soft dough, which is then dried and milled. In another method, the sweetening agent is granulated with a caramel solution or the powder mix of a dry caramel powder and the sweetening agent is granulated in water using a Hobart mixer, or other conventional granulation means such as mechanical mixing granulators, fluid-bed granulators, or rotoprocessors. In another method, the artificial sweetening agent may be added to a coater, followed by addition of a caramel solution to coat and granulate the sweetening agents. In another method, caramel in dry form is added to aspartame in dry form. The simple mixture has surprisingly been found to have an increased dissolution rate, even without any wetting This is particularly surprising with the small amounts of caramel contemplated.

The resulting granular or powder particles have a rapid dissolution rate. Thus, aspartame and other artificial sweetening agents may be used in a variety of applications in which rapid dissolution rates are required, yet low levels of caramel as a dissolution aid are required due to color, taste, or other considerations. Additionally, caramel appears to have excellent wettability and dispersibility which enable granular particles to dissolve more rapidly than expected More than one sweetening agent may be mixed together in a product including caramel. A particularly preferred sweetening agent mixture is aspartame and acesulfame-K in combination with caramel.

Small amounts of conventional bulking agents may also be included in a product. These bulking agents may be desired applications in which certain physical property improvements are desired, for example, making harder granular particles. The maximum amount of bulking agent contemplated herein is about 15% by dry weight of said product. The total amount of caramel and bulking agent is preferably less than 30% by dry weight of said product. The bulking agent is only added in an amount to provide enhanced hardness to the granular particles. The consumable product including caramel and sweetening agent may be used in a variety of products, including but not limited to food products, beverages, juices, alcoholic beverages, soft drinks and other carbonated beverages, confectionery products (candies, chewing gums, baked goods, pastries, breads, etc.), oral hygiene products, pharmaceutical products and veterinary food products.

The following examples show various manners of manufacturing caramel-aspartame products and comparisons with aspartame mixed with other powdered and syrup bulking agents. The examples are included for illustrative purposes only and are not meant to limit the scope of the invention.

EXAMPLE 1

Caramel-aspartame mixtures were prepared by diluting commercially available caramel syrup with water. The diluted solution was added to powdered aspartame to form a wet slurry. The slurry was filtered and dried in a vacuum oven at 50° C. The dried filter cakes resulting from the slurry were milled and sieved to produce samples having various particle sizes (granules or powders). For purposes of this application, granular particles shall be considered to have an average size of about 20 to 60 U.S. Standard (Std) Mesh and powder particles shall be considered to have particle size smaller than 60 U.S. Std Mesh. The following table shows the dissolution rates of various caramel-aspartame mixtures. All product assay percentages are dry weight percentages.

| Caramel Type | Beginning Caramel Amt (Gm) | Beginning Aspartame Amt (Gm) | Avg. Particle Size (US Std Mesh) | Complete Dissolution (sec) | Product Assay (% Composition) | |
|---|---|---|---|---|---|---|
| | | | | | Aspartame | Caramel |
| Sethness Double Strength ™ | 40 | 100 | −60 | 18 | | |
| | | | 40-60 | 18 | 87.6 | 11.2 |
| Sethness Double Strength ™ | 10 | 100 | −60 | 24 | | |
| | | | 40-60 | 52 | 95.1 | 4.4 |
| Sethness AP100 ™ | 25 | 100 | −60 | 12 | | |
| | | | 40-60 | 36 | 89.6 | 7.6 |
| Sethness B&C145 ™ | 25 | 100 | −60 | 12 | | |
| | | | 40-60 | 35 | 92.6 | 6.7 |
| Sethness RT80 ™ | 25 | 100 | −60 | 12 | | |
| | | | 40-60 | 22 | 88.5 | 8.4 |

-continued

| Caramel Type | Beginning Caramel Amt (Gm) | Beginning Aspartame Amt (Gm) | Avg. Particle Size (US Std Mesh) | Complete Dissolution (sec) | Product Assay (% Composition) Aspartame | Product Assay (% Composition) Caramel |
| --- | --- | --- | --- | --- | --- | --- |
| Sethness RT80 TM | 12.5 | 100 | −60 | 15 | | |
| | | | 40-60 | 40 | 94 | 5.6 |
| Sethness YT25 TM | 25 | 100 | −60 | 13 | | |
| | | | 40-60 | 40 | 92 | 6.4 |
| Sethness RT120 TM | 25 | 100 | −60 | 14 | | |
| | | | 40-60 | 18 | 92.4 | 5.7 |
| Sethness RT240 TM | 25 | 100 | −60 | 12 | | |
| | | | 40-60 | 25 | 93.4 | 5.3 |

The caramel in the product assay is significantly less than the beginning caramel amount, as part of the caramel is removed as filtrate during the filtration step.

EXAMPLE 2

Caramel-aspartame mixtures were obtained by mixing commercially available powdered caramel with powdered aspartame. Water was added to the powdered mix, which was then mixed.

The mixture was then dried and sieved through a 60 U.S. Standard Mesh screen.

| Caramel Type | Caramel Amt (Gm) | Aspartame Amt (Gm) | Avg. Particle Size (US Std Mesh) | Complete Dissolution (sec) |
| --- | --- | --- | --- | --- |
| Sethness RT175 TM | 10 | 100 | −60 | 14 |
| Sethness AP680 TM | 10 | 100 | −60 | 14 |

EXAMPLE 3

Aspartame in powder form was mixed with other soluble bulking agents in powder or syrup form. Water was added to wet the powdered mix, which was then mixed. The mixture was then dried and sieved to obtain samples of particle size below 60 U.S. Standard Mesh. When the bulking agents are in syrup form, they are first diluted with water and added to aspartame to wet the aspartame particles.

| | Bulking Agent Amt (Gm) | Aspartame Amt (Gm) | Avg. Particle Size (US Std Mesh) | Complete Dissolution (sec) |
| --- | --- | --- | --- | --- |
| Maltrin M150 TM | 10 | 100 | −60 | 80 |
| Lycasin (Syrup) | 12 | 100 | −60 | 96 |
| Corn Syrup Solids | 5 | 100 | −60 | 170 |
| Gum Arabic | 5 | 100 | −60 | 75 |
| Tween 80 TM (Syrup) | 5 | 100 | −60 | 75 |
| Tween 80 TM Syrup | 10 | 100 | −60 | 50 |
| Fructose | 10 | 100 | −60 | 120 |
| Sucrose | 10 | 100 | −60 | 120 |
| Dextrose | 10 | 100 | −60 | 165 |
| Sodium saccharin | 10 | 100 | −60 | 140 |
| Sodium cyclamate | 10 | 100 | −60 | 250 |
| Acesulfame-K | 10 | 100 | −60 | 165 |
| Sorbitol | 10 | 100 | −60 | 200 |
| High Fructose Corn Syrup (Syrup) | 5 | 100 | −60 | 180 |
| Gum Arabic | 30 | 100 | 30-80 | 156 |
| Gum Arabic | 30 | 100 | −80 | 45 |

EXAMPLE 4

A bulking agent in powder form was dissolved in water. The solution was added to aspartame powder to wet and granulate aspartame. The mixture was then dried and sieved to obtain samples of various particle sizes.

| | Bulking Agent Amt (Gm) | Aspartame Amt (Gm) | Avg. Particle Size (US Std Mesh) | Complete Dissolution (sec) |
| --- | --- | --- | --- | --- |
| Sorbitol | 10 | 100 | −60 | 156 |
| Sorbitol | 10 | 100 | 40-60 | 288 |
| Polydextrose | 10 | 100 | −60 | 150 |
| Polydextrose | 10 | 100 | 40-60 | 276 |

EXAMPLE 5

22.5 g of aspartame in powder form was gently mixed with 2.5 g of caramel in powder form (AP 680, distributed by Sethness Products Company) in a glass bowl using a teaspoon. A sample of the material was dissolved (0.1 g in 120 ml room temperature deionized water with gentle stirring). Over 95% of the sample was dissolved in 10 seconds and the sample was completely dissolved within 45 seconds.

Thus, it can be seen that, in general, products having caramel mixed with aspartame have a faster dissolution rate than conventional bulking agents or sweetening agents mixed alone with aspartame. The results achieved by the use of caramel with aspartame are superior to other bulking agents. These results allow aspartame or other sweetening agents to be used in applications where a fast-dissolving sweetener with minimal amount of bulking agent is desired.

The principle of the invention and the best mode contemplated for applying that principle have been described. It is to be understood that the foregoing examples are illustrative only and that other means and techniques can be employed without departing from the true scope of the invention defined in the following claims.

I claim:

1. A consumable product in granular or powder form comprising a mixture of a sweetening agent selected from the group consisting of aspartame, saccharin, cyclamates, acesulfame-K, trichlorogalactose, alitame, all salts and mixtures thereof and a dehydrated caramel, said sweetening agent present in said mixture in an amount from about two times to about two hundred times the amount of said caramel by weight, said consumable product having a dissolution rate faster than said sweetening agent alone and wherein said sweetening agent comprises at least 70% by dry weight of said product and said caramel comprises from 0.5 to 30% by dry weight of said product.

2. The consumable product of claim 1 wherein said sweetening agent is aspartame.

3. The consumable product of claim 2 wherein said sweetening agent comprises a mixture of aspartame and acesulfame-K.

4. The consumable product of claim 1 further comprising a bulking agent in an amount effective to provide desired bulk, said bulking agent present in an amount not exceeding 15% by dry weight of said product with the proviso that said caramel and said bulking agent together do not exceed about 30% by dry weight of said product, is selected from the group consisting of: gum arabic, lycasin, maltodextrin and corn syrup solids.

5. The consumable product of claim 1 wherein said sweetening agent comprises 90 to 97% by weight of said product and said dehydrated caramel comprises 3 to 10% by weight of said product.

6. A method of producing a consumable product in powder form having an improved dissolution rate comprising the step of mixing a sweetening agent selected from the group consisting of aspartame, saccharin, cyclamates, acesulfame-K, trichlorogalactose, alitame, all salts and mixtures thereof and a dry caramel, said mixing carried out without the addition of water or other solvent, said sweetening agent present in said mixture in an amount of about two times to about two hundred times by dry weight the amount of said caramel and wherein said sweetening agent comprises at least 70% by dry weight of said product and said caramel comprises from 0.5 to 30% by dry weight of said product.

7. A method for producing a consumable product in powder or granular form, comprising the steps of:
mixing dehydrated caramel with aspartame to produce a mixture, said aspartame present in an amount of from about two times to about two hundred times by dry weight the amount of said caramel;
adding an amount of water sufficient to dissolve said caramel while continuing mixing; and drying the wetted mixture and wherein said sweetening agent comprises at least 70% by dry weight of said product and said caramel comprises from 0.5 to 30% by dry weight of said product.

8. The method of claim 7 wherein said dried mixture is milled and sieved to produce granular or powder particles.

9. The method of claim 7 further comprising the step of adding a powdered bulking agent selected from the group consisting of gum arabic, lycasin, maltodextrin and corn syrup solids to said powdered caramel, said bulking agent added in an amount comprising from about 2% to about 15% by dry weight of said product with the proviso that the total amount of said bulking agent and said caramel does not exceed 30% by dry weight of said product.

10. The method of claim 7 wherein said mixing step is carried out in equipment selected from the group consisting of mechanical mixing granulators, fluid-bed granulators and roto-processors.

11. A method for producing a consumable product in powder or granular form, comprising the steps of:
diluting caramel syrup with water;
adding said diluted caramel syrup to a sweetening agent in powdered form selected from the group consisting of aspartame, saccharin, cyclamates, acesulfame-K, trichlorogalactose, alitame, and all salts and mixtures thereof to form a wet slurry, said sweetening agent present in an amount of from about two times to about two hundred times by dry weight the amount of said caramel; and
drying and sieving said wetted mixture to produce a granular or powder product and wherein said sweetening agent comprises at least 70% by dry weight of said product and said caramel comprises from 0.5 to 30% by dry weight of said product.

12. The method of claim 11 further comprising the step of adding a bulking agent selected from the group consisting of gum arabic, lycasin, maltodextrin and corn syrup solids to said diluted caramel syrup, said bulking agent added in an amount comprising from about 2% to about 15% by dry weight of said product with the proviso that the total amount of said bulking agent and said caramel does not exceed 30% by dry weight of said product.

13. The method of claim 11 wherein said mixing step is carried out in equipment selected from the group consisting of mechanical mixing granulators, fluid-bed granulators and roto-processors.

* * * * *